(12) United States Patent
Nakayama

(10) Patent No.: US 10,621,458 B2
(45) Date of Patent: Apr. 14, 2020

(54) PROCESSING DEVICE, NON-TRANSITORY RECORDING MEDIUM STORING COMPUTER-READABLE PROGRAM, AND DATA CONVERSION SYSTEM

(71) Applicant: Konica Minolta, Inc., Chiyoda-ku, Tokyo (JP)

(72) Inventor: Yoshimi Nakayama, Hino (JP)

(73) Assignee: Konica Minolta, Inc., Chiyoda-ku, Tokyo (JP)

(*) Notice: Subject to any disclaimer, the term of this patent is extended or adjusted under 35 U.S.C. 154(b) by 0 days.

(21) Appl. No.: 15/898,740

(22) Filed: Feb. 19, 2018

(65) Prior Publication Data
US 2018/0268241 A1 Sep. 20, 2018

(30) Foreign Application Priority Data

Mar. 15, 2017 (JP) .................. 2017-049966

(51) Int. Cl.
| | |
|---|---|
| *G06K 9/32* | (2006.01) |
| *H04N 1/00* | (2006.01) |
| *H04N 1/32* | (2006.01) |
| *G06F 3/12* | (2006.01) |
| *G06K 9/00* | (2006.01) |
| *G06K 9/03* | (2006.01) |
| *G06K 9/20* | (2006.01) |

(52) U.S. Cl.
CPC ......... *G06K 9/3241* (2013.01); *G06F 3/1215* (2013.01); *G06K 9/00456* (2013.01); *G06K 9/00979* (2013.01); *G06K 9/03* (2013.01); *H04N 1/00209* (2013.01); *H04N 1/32101* (2013.01); *G06K 9/2054* (2013.01); *H04N 2201/3225* (2013.01)

(58) Field of Classification Search
None
See application file for complete search history.

(56) References Cited

U.S. PATENT DOCUMENTS

| | | | |
|---|---|---|---|
| 8,248,641 B2* | 8/2012 | Kazume | H04N 1/00222 358/1.13 |
| 9,323,482 B2* | 4/2016 | Suzuki | G06F 3/1222 |

(Continued)

FOREIGN PATENT DOCUMENTS

JP     2016-126600 A     7/2016

*Primary Examiner* — Miya J Williams
(74) *Attorney, Agent, or Firm* — Buchanan Ingersoll & Rooney PC

(57) ABSTRACT

A considerable amount of time was required for the completion of an objectization process on image data. A time predictor in a processing device predicts the time required for each of a local processing device and remote processing devices to convert image data to objectized data. A device selector selects, based on the predicted time, the local processing device or one of the remote processing devices as a processing device that acquires the objectized data derived from the image data within a short period of time, and instructs the selected processing device to perform the objectization process. A data manager manages the image data that is to be transmitted from a data transceiver to the selected processing device, and the objectized data that is to be received by the data transceiver from the selected processing device.

51 Claims, 9 Drawing Sheets

(56) References Cited

U.S. PATENT DOCUMENTS

| | | | |
|---|---|---|---|
| 2003/0095282 A1* | 5/2003 | Suzuki | G06F 3/1247 358/1.15 |
| 2003/0184799 A1* | 10/2003 | Ferlitsch | G06F 9/505 358/1.15 |
| 2005/0094175 A1* | 5/2005 | Christiansen | G06F 3/122 358/1.13 |
| 2007/0297672 A1* | 12/2007 | Eschbach | H04N 1/3871 382/173 |
| 2010/0082698 A1* | 4/2010 | Ito | G06F 16/93 707/802 |
| 2010/0238484 A1* | 9/2010 | Komine | G06F 3/1204 358/1.15 |
| 2012/0075648 A1* | 3/2012 | Keys | G06K 9/00979 358/1.11 |
| 2013/0063763 A1* | 3/2013 | Tse | H04N 1/00127 358/1.15 |
| 2014/0009775 A1* | 1/2014 | Yonezawa | G06F 3/126 358/1.13 |
| 2016/0119506 A1* | 4/2016 | Namihira | H04N 1/64 358/426.01 |
| 2016/0139859 A1* | 5/2016 | Nagata | G06F 3/124 358/1.15 |

\* cited by examiner

PROCESSING DEVICE, NON-TRANSITORY RECORDING MEDIUM STORING COMPUTER-READABLE PROGRAM, AND DATA CONVERSION SYSTEM

CROSS-REFERENCE TO RELATED APPLICATIONS

The entire disclosure of Japanese Patent Application No. 2017-049966, filed on Mar. 15, 2017, is incorporated herein by reference in its entirety.

TECHNOLOGICAL FIELD

The present invention relates to a processing device, a non-transitory recording medium storing a computer-readable program, and a data conversion system.

DESCRIPTION OF THE RELATED ART

According to a conventional method, text handwritten on a whiteboard or paper and text, drawing, and other information printed on one or more sheets of paper can be read with a scanner to obtain their image data and convert the obtained image data to editable data with general-purpose application software. When this method is used, an objectization process is performed by converting text and drawing included in the image data (e.g., JPEG (Joint Photographic Experts Group) data, TIFF (Tagged Image File Format) data, and PDF (Portable Document Format) data), which is obtained by scanning the above-mentioned paper, to text data and drawing objects, respectively. As a result, the objectization process generates objectized data that can be edited by general-purpose application software (e.g., Word (registered trademark), Excel (registered trademark), and PowerPoint (registered trademark)).

When the time required for RIP processing varies with operating status, a technology disclosed in Patent Literature 1 predicts a file size and a network transfer speed, and performs a rasterization process at a place where processing is rapidly terminated.

CITATION LIST

Patent Literature

Patent Literature 1: Japanese Unexamined Patent Application Publication No. 2016-126600

SUMMARY

In general, a CPU (Central Processing Unit) included in an edge server or cloud server connected to an image formation device through a network has a higher processing capability than a CPU included in the image formation device and a CPU included in a controller mounted in the image formation device. Further, as the image formation device occasionally needs to perform a printing process and other processes in addition to the objectization process, for example, an edge server or a cloud server is set, by default, as a processing device that performs the objectization process. In the following description, when the edge server and the cloud server are not to be distinguished from each other, each of them will be simply referred to as a "server". The image formation device is capable of transmitting image data obtained by scanning one or more sheets of paper to the server through the network and allowing the server to perform the objectization process.

However, if the amount of data increases depending on the resolution or type of image, an increased load is imposed on the network so that data transmission and reception require an excessive amount of time. As a result, the server is unable to rapidly perform the objectization process.

Further, when image data derived from one or more sheets of paper scanned by the image formation device is subjected to the objectization process, the objectized data is often transferred through the network, for example, to a shared folder available to each user. However, when a user selects a function of writing the processed data onto a storage medium connected to the image formation device, the user is forced to wait in the vicinity of the image formation device until the objectized data is completely written onto the storage medium. Meanwhile, if an increased load is imposed on the network so that a considerable amount of time is required for the server to perform the objectization process, the time interval between the instant a document is scanned by the user and the instant the objectized data is completely written onto the storage medium increases as well. In such a situation, the user is likely to become dissatisfied because the user is forced to wait for a long time in front of the image formation device.

Moreover, a technology for predicting the time required for RIP processing in accordance with a file size and a network transfer speed is disclosed in Patent Literature 1. In most cases, however, the file size is not related to the objectization process. For example, if a small-sized file contains a large number of small-size images, the required processing time may be longer than predicted. Therefore, even if the technology disclosed in Patent Literature 1 is used, it is difficult to predict the time required for the completion of processing.

The present invention has been made in view of the above circumstances to reduce the time required for acquiring objectized data from image data.

To achieve at least one of the abovementioned objects, according to an aspect of the present invention, a processing device reflecting one aspect of the present invention is provided which includes a device information acquirer and an objectization processor. The device information acquirer acquires device information about a local processing device and device information about a remote processing device that is connected to the local processing device through a network. The objectization processor converts image data into objectized data. The objectization processor includes an object converter, a time predictor, a device selector, and a data manager. The object converter generates objectized data by performing an objectization process of converting an image in image data to an object in accordance with attribute information attached to the image. The time predictor predicts, based on the device information and the attribute information attached to the image data, the time required for each of the local processing device and the remote processing device to perform the objectization process of converting the image data to the objectized data. The device selector selects, based on the predicted time, either the local processing device or the remote processing device as a processing device that acquires the objectized data derived from the image data within a short period of time, and instructs the selected processing device to perform the objectization process. The data manager manages the image data that is to be transmitted from a data transceiver to the selected processing device, and the objectized data that is to be received by the data transceiver from the selected processing device.

The above-described processing device is according to an aspect of the present invention. A non-transitory recording medium storing a computer-readable program and a data conversion system that reflect an aspect of the present invention have the same configuration as the processing device that reflects an aspect of the present invention.

BRIEF DESCRIPTION OF THE DRAWINGS

The advantages and features provided by one or more embodiments of the present invention will become more fully understood from the detailed description given below and the appended drawings which are given by way of illustration only, and thus are not intended as a definition of the limits of the present invention.

DETAILED DESCRIPTION OF EMBODIMENTS

Figure 1:
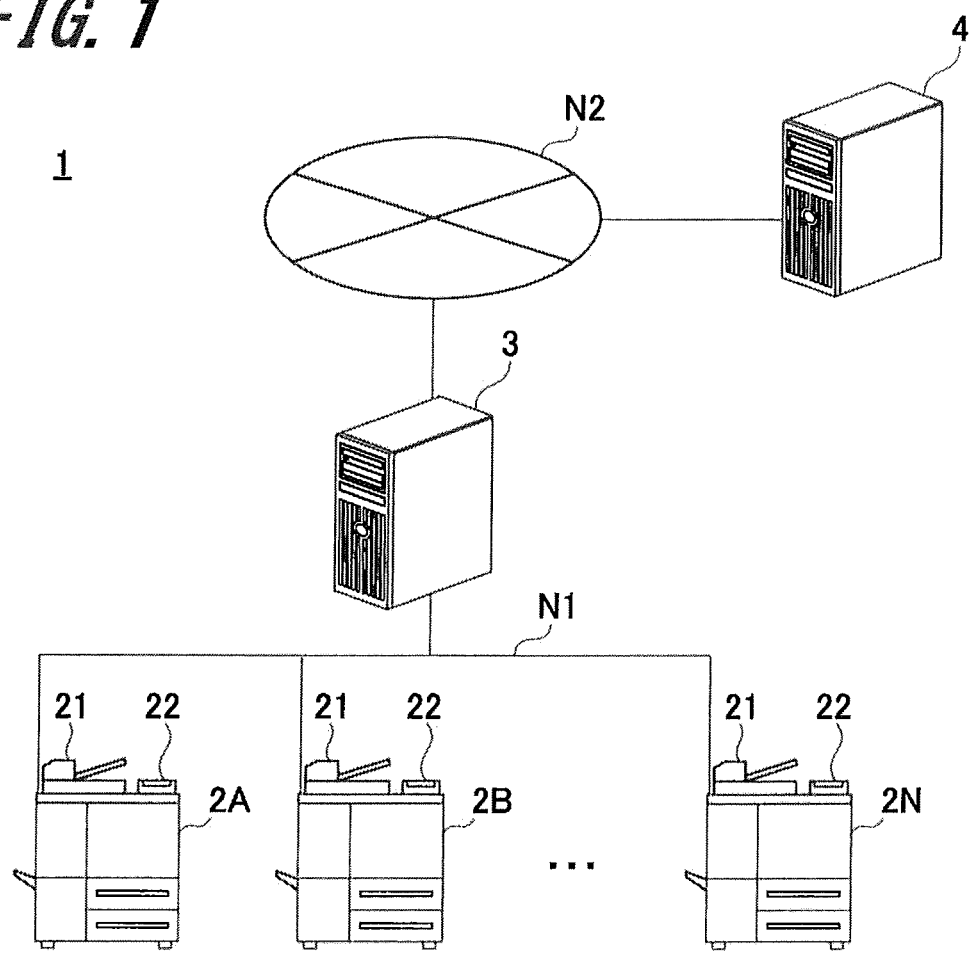
FIG. 1 is a schematic diagram illustrating an exemplary overall configuration of a data conversion system according to an embodiment of the present invention.

Hereinafter, one or more embodiments of the present invention will be described with reference to the accompanying drawings. However, the scope of the present invention is not limited to the disclosed embodiments. In the following description and in the accompanying drawings, elements having substantially the same function or configuration are designated by the same reference numerals and will not be redundantly described.

Embodiment

FIG. 1 is a schematic diagram illustrating an exemplary overall configuration of a data conversion system 1.

System Configuration

The data conversion system 1 includes a plurality of image formation devices 2A-2N, an edge server 3, and a cloud server 4. The image formation devices 2A-2N and the edge server 3 are connected through an internal network N1 such as an in-house LAN (Local Area Network). The edge server 3 and the cloud server 4 are connected through an external network N2 that is managed, for example, by an external provider. The external network N2 is, for example, a telephone network, a broadband communication network, a leased line, a mobile communication network, a communication satellite line, a CATV (Community Antenna Television) line, an optical communication line, or a wireless communication line.

FIG. 1 illustrates an example in which a plurality of image formation devices (N image formation devices) 2A-2N, one edge server 3, and one cloud server 4 are connected. However, the number of installed units is not specifically limited. Further, in the data conversion system 1, the image formation devices 2A-2N, the edge server 3, and the cloud server 4 are each used as a processing device capable of performing a later-described objectization process.

The image formation devices 2A-2N are connected to the internal network N1, which is capable of establishing secure communication. In accordance with an operating instruction from an operating display 22 on the image formation devices 2A-2N or with a printing instruction transmitted from a PC (not shown) through a network, an image formation process (referred also as a printing process) is performed on print data received from the PC. The image formation devices 2A-2N are also capable of reading, for example, text and drawing printed on one or more sheets of paper fed from an automatic document feeder (ADF) 21 and outputting the read image data. For example, a copier, a printer, a facsimile machine, or a multi-function machine having two or more functions of the foregoing machines may be used as the image formation devices 2A-2N.

The edge server 3 (an example of the server) manages the image formation devices 2A-2N and presides over the image formation devices 2A-2N. In this instance, the edge server 3 distributes the processing load on the image formation devices 2A-2N or performs the objectization process on image data in accordance with an instruction from one of the image formation devices 2A-2N. Further, the edge server 3 is an interface to the external network N2 such as the Internet, and is disposed at a boundary between the internal network N1 and the external network N2. The edge server 3 is capable of connecting to the cloud server 4 in place of the image formation devices 2A-2N and transferring an instruction for the objectization process on image data.

The cloud server 4 (an example of the server) is connected to the external network N2, which is different from the internal network N1, and is capable of communicating with the edge server 3 through the external network N2. The external network N2 can also be set so as to establish secure communication. Upon receiving an instruction from the edge server 3, the cloud server 4 performs the objectization process on image data and performs a process of returning objectized data to the edge server 3.

The image formation device 2A will be hereinafter referred to as the "local processing device" in order to describe a configuration and operation of the data conversion system 1 with main reference to the image formation device 2A. Further, when the edge server 3, the cloud server 4, and the image formation devices 2B-2N except for the image formation device 2A are not to be distinguished from each other, each of them is referred to also as a "remote processing device". The image formation devices 2B-2N are equal to the image formation device 2A in functionality and processing capability. The edge server 3 and the cloud server 4 have a higher processing capability for the objectization process than the image formation device 2A. When the internal network N1 and the external network N2 are not to be distinguished from each other, each of them is referred to also as a "network".

Attribute Information

Attribute information will now be described.

Figure 2:
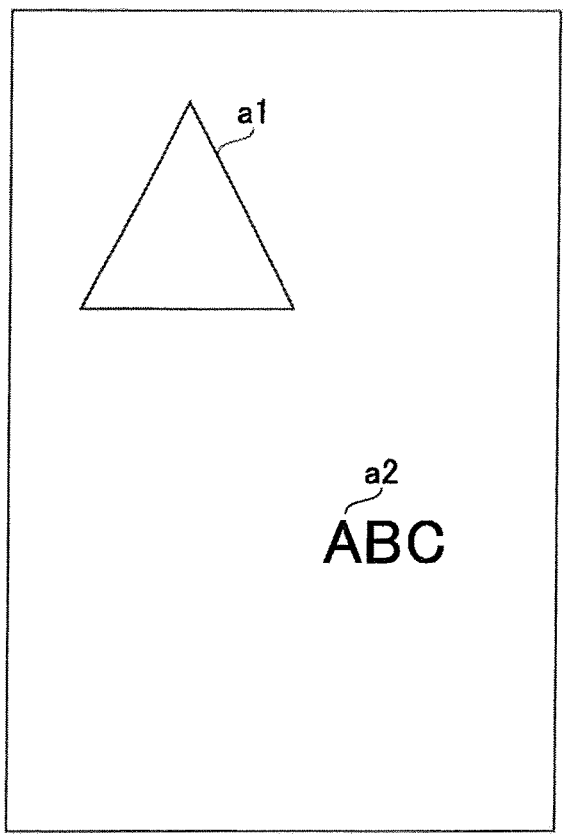
FIG. 2 is a diagram illustrating a drawing, text, and attribute information according to an embodiment of the present invention.

FIG. 2 is a diagram illustrating examples of a drawing, text, and attribute information.

When a handwritten memo or a handout is scanned by the image formation device 2A having a later-described scanner 21a shown in FIG. 3, digitized image data (RAW, JPEG, PNG (Portable Network Graphics), PDF, etc.) shown at left in FIG. 2 is obtained. Attribute information to be used for color determination and image processing by the image formation device 2A is attached to each pixel in the image data. The attribute information is attached by controller hardware (e.g., image processing ASIC (Application Specific Integrated Circuit)) (not shown) or software included in the image formation device 2A. Shown at right in FIG. 2 is image data having pixels to each of which the attribute information is attached. The image data to which the attribute information is attached is stored in a RAM or other storage medium included in the image formation device 2A.

Figure 7:
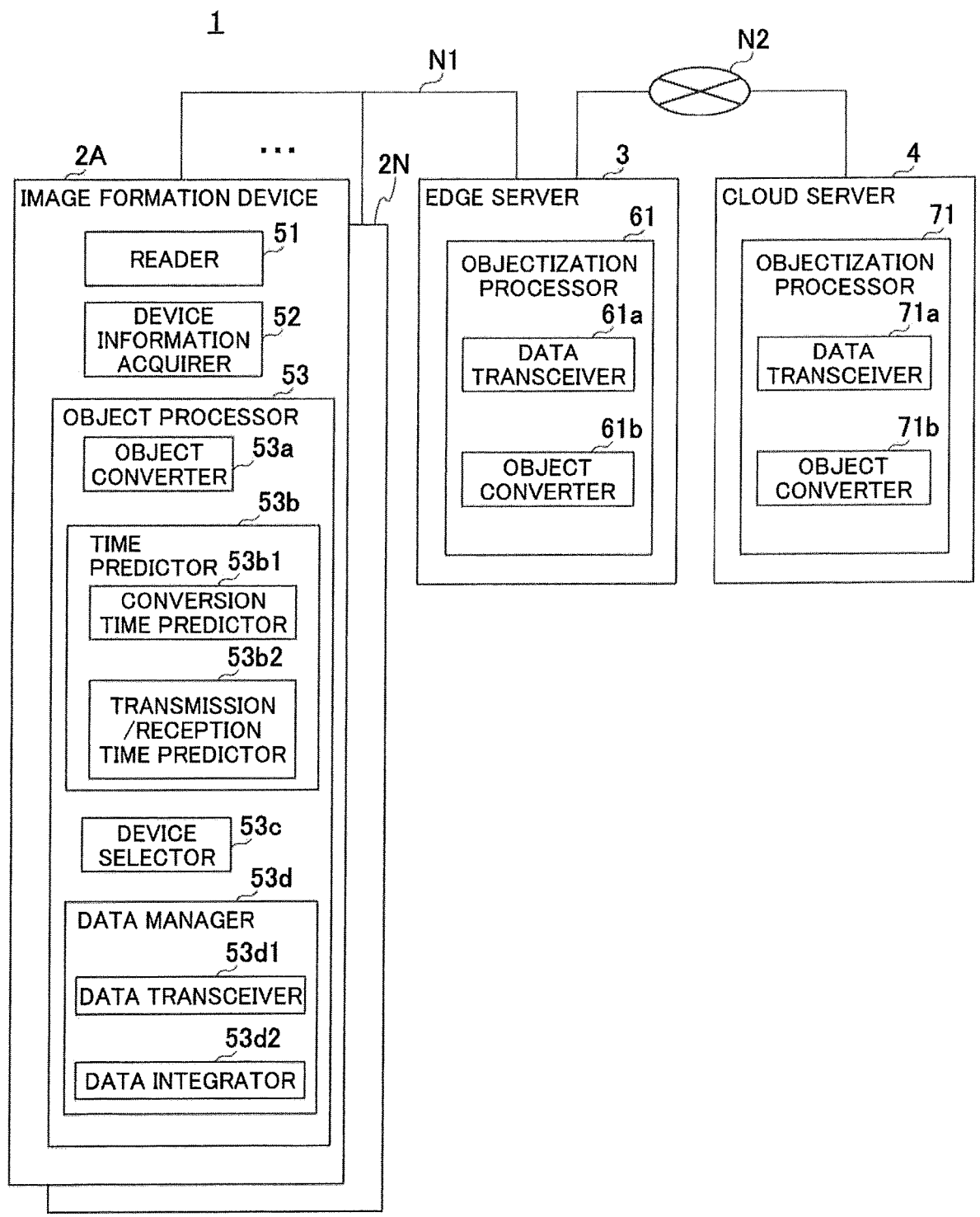
FIG. 7 is a diagram illustrating a configuration of functional blocks that are implemented by respective controllers of the image formation device, edge server, and cloud server according to an embodiment of the present invention.

The attribute information is expressed by 2 bits. It is assumed, for example, that "0" represents the absence of attribute information, "1" represents a drawing attribute, and "2" represents a text attribute. An image of a triangle a1 and an image of a character string a2 are shown at left in FIG. 2. In accordance with the edge of the triangle a1, a reader 51 or an object converter 53a, which are shown in FIG. 7 and described later, attaches the attribute information "1" to pixels in a rectangular region b1 that is shown at right in FIG. 2 to enclose the triangle a1. The attribute information "0" is attached to pixels that do not correspond to the edge of the triangle a1. Similarly, in accordance with the character string a2 shown at left in FIG. 2, the attribute information "2" is attached to pixels in a rectangular region b2 that is shown at right in FIG. 2 to enclose the character string a2. As described above, the attribute information is a code indicating that the image represents a drawing, text, or information other than a drawing and text. Additionally, the attribute information indicates whether data is present. For example, a portion to which "0" is attached indicates that there is no data to be objectized.

Pixels to which the attribute "1" or "2" is attached are expressed as the rectangular regions b1, b2. Therefore, based on the rectangular regions b1, b2, the image formation device 2A can determine, for example, the number of available objects and the attributes and sizes of the available objects.

The attribute information may be attached to each pixel or to each region of nxm pixels. Further, the attribute information may be not only attached when one or more sheets of paper on which a memo or other information is printed are scanned by the later-described scanner 21a shown in FIG. 3, but may also be attached by performing a software process on jpeg image data derived from a digital camera that has captured an image, for example, of characters written on a notebook, a sheet of paper, or a whiteboard or by performing a software process on image data read by a scanner provided for the whiteboard.

The image formation device 2A is then able to perform the objectization process of converting the image data to an object in accordance with the attribute information attached to each pixel. The objectization process is performed in accordance with the attribute information attached to each pixel in order, for example, to convert a drawing portion in the image data to a drawing object, convert a text portion in the image data to a text object, and convert the resulting objects to a file format editable by general-purpose application software.

Further, the objectization process may be performed not only by the image formation device 2A, but may also be performed by any one of the image formation devices 2B-2N, by the edge server 3, and by the cloud server 4. If the same image data is inputted to the image formation devices and to the servers, the same objectized data is obtained.

Exemplary Hardware Configuration of Image Formation Device

Figure 3:
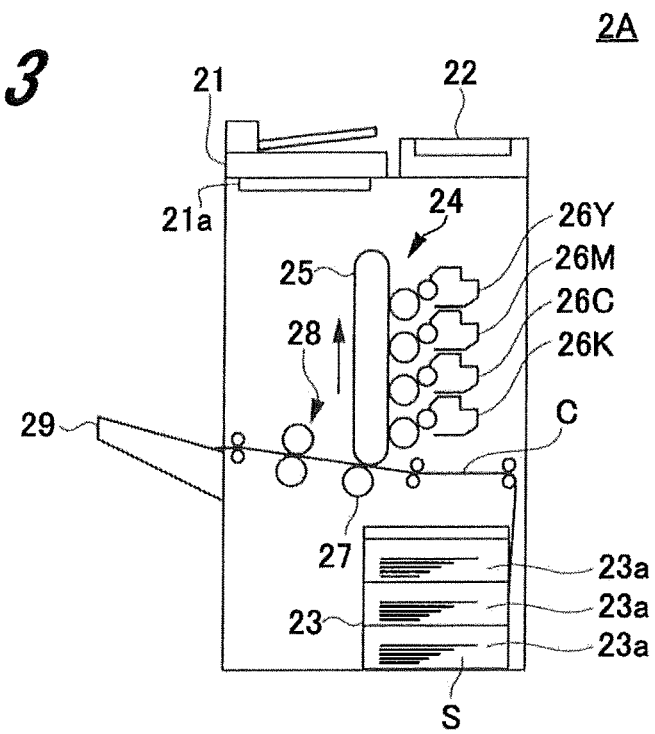
FIG. 3 is a schematic diagram illustrating an exemplary hardware configuration of an image formation device according to an embodiment of the present invention.

FIG. 3 is a schematic diagram illustrating an exemplary hardware configuration of the image formation device 2A. The image formation devices 2B-2N, which have the same configuration as the image formation device 2A, will not be redundantly illustrated or described.

The image formation device 2A adopts an electrophotographic method of forming an image with static electricity, and is a tandem color image formation device that superimposes, for example, toner images of four colors, namely, yellow (Y), magenta (M), cyan (C), and black (K). The image formation device 2A includes an automatic document feeder 21, an operating display 22, a paper feeder 23, an image former 24, an intermediate transfer belt 25 (image carrier), a secondary transferrer 27, a fixer 28, and a paper discharge tray 29.

The automatic document feeder 21 automatically feeds a document when the document is to be read. The scanner 21a disposed beneath the automatic document feeder 21 is capable of reading an image of a document placed on upper platen glass of the image formation device 2A and an image of a document automatically fed by the automatic document feeder 21.

The operating display 22 functions as an operating control and issues an instruction for starting, for example, an image formation processing or other job. The operating display 22 is formed of a touch panel provided, for example, with an LCD (Liquid-Crystal Display) and capable of allowing a user to perform an operation and displaying information. The operating display 22 acts as both an operating control and a display. The operating control may be formed, for example, of a mouse and a tablet and separated from the display.

The paper feeder 23 includes a plurality of paper storages 23a capable of storing sheets of paper that differ in size and type. When a relevant paper storage 23a is selected in response to an instruction from the image formation device 2A, the paper feeder (not shown) takes a sheet of paper S out of the paper storage 23a and feeds the sheet of paper S to a transport path C.

The image former 24 includes four image formation units 26Y, 26M, 26C, 26K in order to form toner images of four colors, namely, yellow, magenta, cyan, and black. The image former 24 forms the yellow, magenta, cyan, and black toner images by controlling the operations of the image formation units 26Y, 26M, 26C, 26K in the image former 24. Further, the image formation device 2A includes a plurality of rollers (transport rollers) for transporting the sheet of paper S to the transport path C. These rollers are generally formed of a roller pair.

In an image formation mode, the image formation device 2A not only charges photoreceptors in the image formation units 26Y, 26M, 26C, 26K, but also makes an exposure to remove electrical charge and form electrostatic latent images on the photoreceptors. A developer is then used to fix a toner to the electrostatic latent images on the yellow, magenta, cyan, and black photoreceptors in order to form toner images of four colors. Next, the toner images formed on the yellow, magenta, cyan, and black photoreceptors are sequentially primary-transferred to the surface of the intermediate transfer belt 25, which rotates in the direction of the arrow.

Subsequently, the secondary transferrer 27 (secondary transfer roller) operates so that the four color toner images, which are primary-transferred to the intermediate transfer belt 25, are secondary-transferred to the sheet of paper S, which is supplied from the paper feeder 23 and transported by the rollers. When the four color toner images on the intermediate transfer belt 25 are secondary-transferred to the sheet of paper S, a color image is formed. The image formation device 2A transports the sheet of paper S on which a color toner image is formed, to the fixer 28.

The fixer 28 is a device that performs a fixing process on the sheet of paper S on which a color toner image is formed. The fixer 28 pressurizes and heats the transported sheet of paper S so that the transferred toner image is fixed on the sheet of paper S. The fixer 28 is formed, for example, of an upper fixer roller and a lower fixer roller, which are fixing members. The upper fixer roller and the lower fixer roller are disposed while they are pressed against each other. Thus, a fixer nipper is formed as a portion compressed tightly between the upper fixer roller and the lower fixer roller.

A heater (not shown) is provided in the upper fixer roller. Radiant heat from the heater warms a roller portion disposed on the outer periphery of the upper fixer roller. The sheet of paper S is transported to the fixer nipper while the upper fixer roller faces a fixing target surface, that is, the surface onto which the toner image is transferred by the secondary transferrer 27. The sheet of paper S passing through the fixer nipper is pressurized by the upper fixer roller and the lower fixer roller and heated by the heat of the roller portion of the upper fixer roller. The sheet of paper S is discharged to the paper discharge tray 29 after being subjected to the fixing process by the fixer 28.

Configuration of Essential Parts of Image Formation Device

Figure 4:
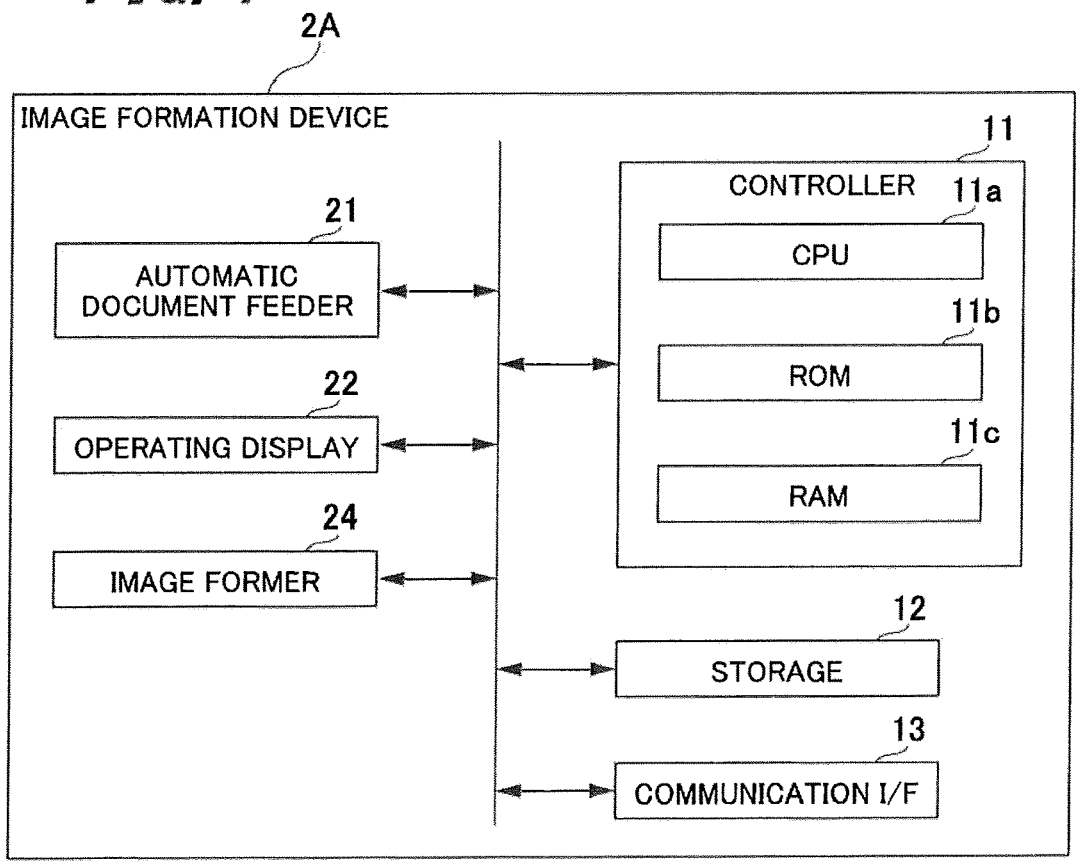
FIG. 4 is a hardware configuration diagram illustrating an exemplary configuration of essential parts of the image formation device according to an embodiment of the present invention.

FIG. 4 is a hardware configuration diagram illustrating an exemplary configuration of essential parts of the image formation device 2A. The image formation devices 2B-2N, which have the same configuration as the image formation device 2A, will not be redundantly illustrated or described.

In addition to the above-described automatic document feeder 21, operating display 22, and image former 24, the image formation device 2A includes a controller 11, a storage 12, and a communication I/F (interface) 13. The elements in the image formation device 2A are connected through a bus.

The controller 11 includes a CPU 11a, a ROM (Read-Only Memory) 11b, and a RAM (Random-Access Memory) 11c. The controller 11 is used as an example of a computer that controls the operations of the elements in the image formation device 2A. The CPU 11a controls, for example, the image formation process (printing operation) of the image former 24, which is performed in accordance with a user's printing instruction issued through the operating display 22, performs an image data objectization process in accordance with the present embodiment, and controls the transmission and reception of various data that are performed by the communication I/F 13.

The ROM 11b is used as an example of a non-volatile memory in order to store, for example, programs and data required for the operations of the CPU 11a.

The RAM 11c is used as an example of a volatile memory in order to temporarily store information (data) required for various processes performed by the CPU 11a.

The storage 12 is formed, for example, of a HDD (hard disk drive) in order to store a program used by the CPU 11a to control various elements and store programs and data, for example, for the OS and controller. The programs and data stored in the storage 12 are partly stored in the ROM 11b as well. The storage 12 is used as an example of a computer-readable non-transitory recording medium that stores the program to be executed by the CPU 11a. Therefore, the program is permanently stored in the storage 12. The computer-readable non-transitory recording medium storing the program to be executed by the image formation device 2A is not limited to the HDD. For example, an SSD (Solid State Drive), a CD-ROM, a DVD-ROM, or other recording medium may be used.

The communication I/F 13 includes, for example, an NIC (Network Interface Card) and a modem, establishes the connection to various devices linked through the internal network N1, and transmits and receives various data. More specifically, the communication VP 13 exchanges various data with a remote processing device.

Configuration of Edge Server

Figure 5:
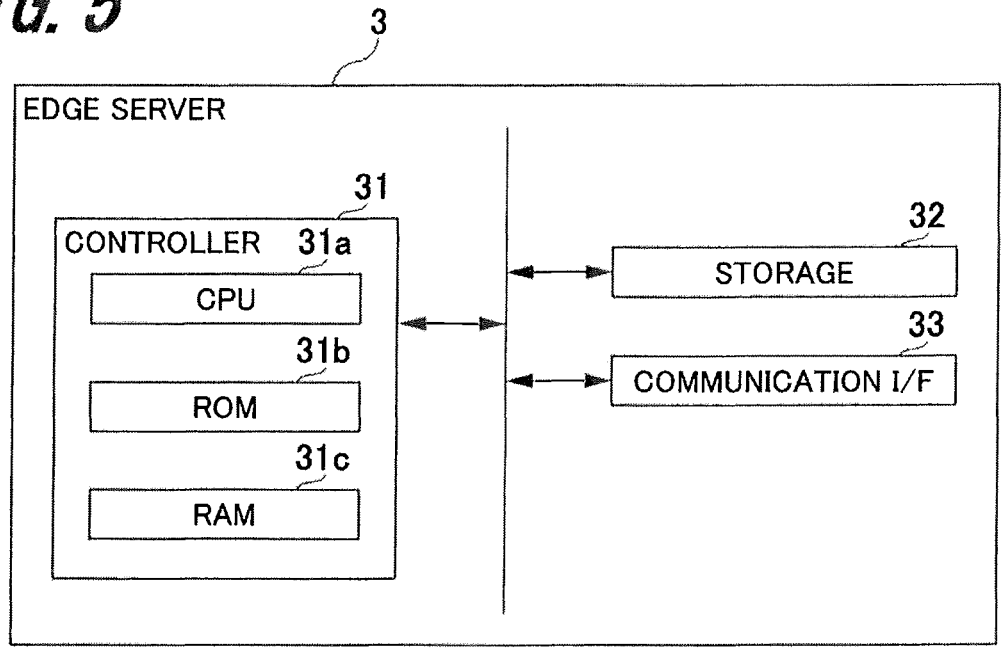
FIG. 5 is a schematic diagram illustrating an exemplary hardware configuration of an edge server according to an embodiment of the present invention.

FIG. 5 is a hardware configuration diagram illustrating an exemplary configuration of the edge server 3.

The edge server 3 includes a controller 31, a storage 32, and a communication I/F 33. The elements in the edge server 3 are connected through a bus.

The controller 31 performs, for example, the objectization process on image data transmitted from the image formation devices 2A-2N.

The controller 31 includes a CPU 31a, a ROM 31b, and a RAM 31c. The controller 31 is used as an example of a computer that controls the operations of the elements in the edge server 3. The CPU 31a performs an image data objectization process in accordance with an instruction from one of the image formation devices 2A-2N and controls the transmission and reception of various data that are performed by the communication I/F 33.

The ROM 31b is used as an example of a non-volatile memory in order to store, for example, programs and data required for the operations of the CPU 31a.

The RAM 31c is used as an example of a volatile memory in order to temporarily store information (data) required for various processes performed by the CPU 31a.

The storage 32 is formed, for example, of a HDD in order to store a program used by the CPU 31a to control various elements and store programs and data, for example, for the OS and controller. The programs and data stored in the storage 32 are partly stored in the ROM 31b as well. The storage 32 is used as an example of a computer-readable non-transitory recording medium that stores the program to be executed by the CPU 31a. Therefore, the program is permanently stored in the storage 32. The computer-readable non-transitory recording medium storing the program to be executed by the edge server 3 is not limited to the HDD. For example, an SSD, a CD-ROM, a DVD-ROM, or other recording medium may be used.

The communication I/F 33 includes, for example, an NIC and a modem, establishes the connection to various devices through the internal network N1 and the external network N2, and transmits and receives various data.

Configuration of Cloud Server

Figure 6:
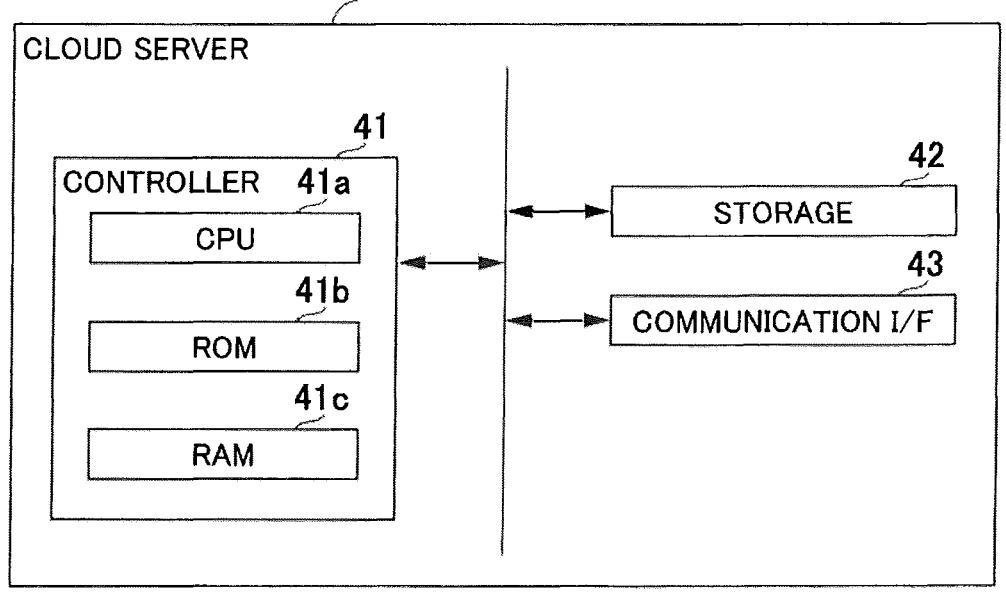
FIG. 6 is a schematic diagram illustrating an exemplary hardware configuration of a cloud server according to an embodiment of the present invention.

FIG. 6 is a hardware configuration diagram illustrating an exemplary configuration of the cloud server 4.

The cloud server 4 includes a controller 41, a storage 42, and a communication I/F 43. The elements in the cloud server 4 are connected through a bus.

The controller 41 performs, for example, the objectization process on image data that is transmitted from the image formation devices 2A-2N through the edge server 3.

The controller 41 includes a CPU 41a, a ROM 41b, and a RAM 41c. The controller 41 is used as an example of a computer that controls the operations of the elements in the cloud server 4. The CPU 41a performs an image data objectization process in accordance with an instruction from one of the image formation devices 2A-2N and controls the transmission and reception of various data that are performed by the communication I/F 43.

The ROM 41b is used as an example of a non-volatile memory in order to store, for example, programs and data required for the operations of the CPU 41a.

The RAM 41c is used as an example of a volatile memory in order to temporarily store information (data) required for various processes performed by the CPU 41a.

The storage 42 is formed, for example, of a HDD in order to store a program used by the CPU 41a to control various elements and store programs and data, for example, for the OS and controller. The programs and data stored in the storage 42 are partly stored in the ROM 41b as well. The storage 42 is used as an example of a computer-readable non-transitory recording medium that stores the program to be executed by the CPU 41a. Therefore, the program is permanently stored in the storage 42. The computer-readable non-transitory recording medium storing the program to be executed by the cloud server 4 is not limited to the HDD. For example, an SSD, a CD-ROM, a DVD-ROM, or other recording medium may be used.

The communication I/F 43 includes, for example, an NIC and a modem, establishes the connection to the edge server 3 through the external network N2, and transmits and receives various data.

Overall Functional Configuration of Data Conversion System

FIG. 7 is a diagram illustrating a configuration of functional blocks that are implemented by the respective controllers of the image formation devices 2A-2N, the edge server 3, and the cloud server 4. FIG. 7 is used to describe an exemplary internal configuration of the image formation device 2A. The image formation devices 2B-2N, which have the same internal configuration as the image formation device 2A, will not be redundantly described.

The image formation device 2A includes a reader 51, a device information acquirer 52, and an objectization processor 53. Functions of the reader 51, device information acquirer 52, and objectization processor 53 are implemented by the controller 11 shown in FIG. 4.

The reader 51 uses the scanner 21a (see FIG. 3) to read an image on a sheet of paper placed on the automatic document feeder 21 or platen glass, and stores the resulting image data in the storage 12 shown in FIG. 4. In this instance, as illustrated in FIG. 2, the reader 51 is capable of attaching attribute information to the image data that is generated by reading the sheet of paper.

The device information acquirer 52 acquires device information about the image formation device 2A, device information about the image formation devices 2B-2N or the edge server 3, which are connected to the image formation device 2A through the internal network N1, and device information about the cloud server 4, which is connected to the image formation device 2A through the external network N2. The device information about the image formation devices 2A-2N includes, for example, the current availability of the CPU 11a and RAM 11c, the device information about the edge server 3 includes, for example, the current availability of the CPU 31a and RAM 31c, and the device information about the cloud server 4 includes, for example, the current availability of the CPU 41a and RAM 41c.

The objectization processor 53 performs the objectization process on image data stored in the storage 12 in order to generate objectized data from the image data. The objectization processor 53 then outputs the objectized data to the storage 12, a shared folder in the edge server 3, or a storage medium in the image formation device 2A. This permits the user to obtain objectized image data. The objectization processor 53 includes an object converter 53a, a time predictor 53b, a device selector 53c, and a data manager 53d.

In accordance with the attribute information attached to an image in the image data, the object converter 53a (an example of a first object converter) generates objectized data by performing the objectization process of converting an image to an object. The object converter 53a particularly performs the objectization process on an image to which the code "1", that is, the code indicative of a drawing, is attached, and on an image to which the code "2", that is, the code indicative of text, is attached. After being subjected to the objectization process, the image data is stored in the storage 12.

In accordance with the device information acquired by the device information acquirer 52 and with the attribute information attached to the image data, the time predictor 53b predicts the time required for each of the local processing device and the remote processing devices to convert the image data to objectized data by performing the objectization process. The time predictor 53b includes a conversion time predictor 53b1 and a transmission/reception time predictor 53b2.

In accordance with the device information about each processing device, the conversion time predictor 53b1 predicts the conversion time required for each of the object converter 53a in the image formation devices 2A-2N, the edge server 3, and the cloud server 4 to convert an image to an object based on the attribute information attached to the image data.

The transmission/reception time predictor 53b2 predicts a data transmission time and a data reception time. The data transmission time is a period of time required for the image formation device 2A to transmit image data to the edge server 3 or the cloud server 4 through the internal network N1 or the external network N2. The data reception time is a period of time required for the image formation device 2A to receive objectized data that is objectized by the edge server 3 or the cloud server 4. For example, the transmission/reception time predictor 53b2 transmits test data to the edge server 3 or the cloud server 4 and measures the time required for the reception of a response to the test data. Then, based on the measured time, the transmission/reception time predictor 53b2 determines the load on the internal network N1 and the external network N2 (e.g., the degree of congestion in each network), and predicts the time required for the transmission and reception of various data through the internal network N1 and the external network N2.

Based on the time predicted by the time predictor 53b, the device selector 53c selects, from among the local processing device and the remote processing devices, a processing device that shortly acquires objectized data obtained by converting the image data, and instructs the selected processing device to perform the objectization process. In this instance, in accordance, for example, with the attribute information attached to the image data, the time required for the image data objectization process, the time predicted by the transmission/reception time predictor 53b2 as the time required for the transmission and reception of various data, and the operating status of each processing device, the device selector 53c selects the processing device that is to be instructed to perform the objectization process. As a result, one or more of the local processing device (image formation device 2A), the edge server 3, and the cloud server 4 are selected.

If, in the above instance, the difference between the sum of the conversion time, data transmission time, and data reception time predicted for the remote processing devices and the conversion time predicted for the image formation device 2A is equal to or smaller than a predetermined value, the device selector 53c may select the image formation device 2A and preferentially instruct the image formation device 2A to perform the objectization process. This reduces the load imposed on the internal network N1 and the external network N2. Alternatively, however, the device selector 53c may select a processing device for which the shortest sum of conversion time, data transmission time, and data reception time is predicted, and preferentially instruct the selected processing device to perform the objectization process.

The data manager 53d includes a data transceiver 53d1 and a data integrator 53d2. The data manager 53d manages the image data to be transmitted from the data transceiver 53d1 to the processing device selected by the device selector 53c and the objectized data to be received by the data transceiver 53d1 from the processing device.

The data transceiver 53d1 (an example of a first data transceiver) controls the communication OF 13 to transmit the image data to the image formation devices 2B-2N, the edge server 3, or the cloud serer 4 or receive the objectized data from the image formation devices 2B-2N, the edge server 3, or the cloud serer 4.

The data integrator 53d2 integrates, in order of pages, the objectized data on each page for which the objectization process is performed by a plurality of remote processing devices selected by the device selector 53c, in such a manner that image data on a plurality of pages are objectized in units of a predetermined number of pages (e.g., in units of one page). As a result, the objectized data on each page, which is objectized by each processing device, is integrated into single objectized data (one file).

The edge server 3 will now be described. The edge server 3 includes an objectization processor 61.

The objectization processor 61 controls the objectization process on the image data received from one of the image formation devices 2A-2N. The objectization processor 61 includes a data transceiver 61a and an object converter 61b.

The data transceiver 61a (an example of a second data transceiver) controls the communication I/F 33 to receive the image data from the image formation devices 2A-2N or transfer the image data to the cloud server 4. Further, the data transceiver 61a controls the communication I/F 33 to transmit the objectized data to the image formation devices 2A-2N. As a result, the image formation devices 2A-2N that have transmitted the image data to the edge server 3 are able to receive the objectized data from the edge server 3.

The object converter 61b (an example of a second object converter) performs the objectization process on the image data received from the image formation devices 2A-2N by following the same procedure as the objectization processor 53.

The cloud server 4 will now be described. The cloud server 4 includes an objectization processor 71.

The objectization processor 71 controls the objectization process on the image data transferred from the edge server 3. The objectization processor 71 includes a data transceiver 71a and an object converter 71b.

The data transceiver 71a (an example of the second data transceiver) controls the communication OF 43 to receive the image data transmitted from the image formation devices 2A-2N and transferred from the edge server 3 or transmit the objectized data to the image formation devices 2A-2N. As a result, the image formation devices 2A-2N that have transmitted the image data to the cloud server 4 are able to receive the objectized data from the cloud server 4 through the edge server 3.

The object converter 71b (an example of the second object converter) performs the objectization process on the image data transferred from the edge server 3 by following the same procedure as the objectization processor 53.

Time Required for Objectization Process

Figure 8:
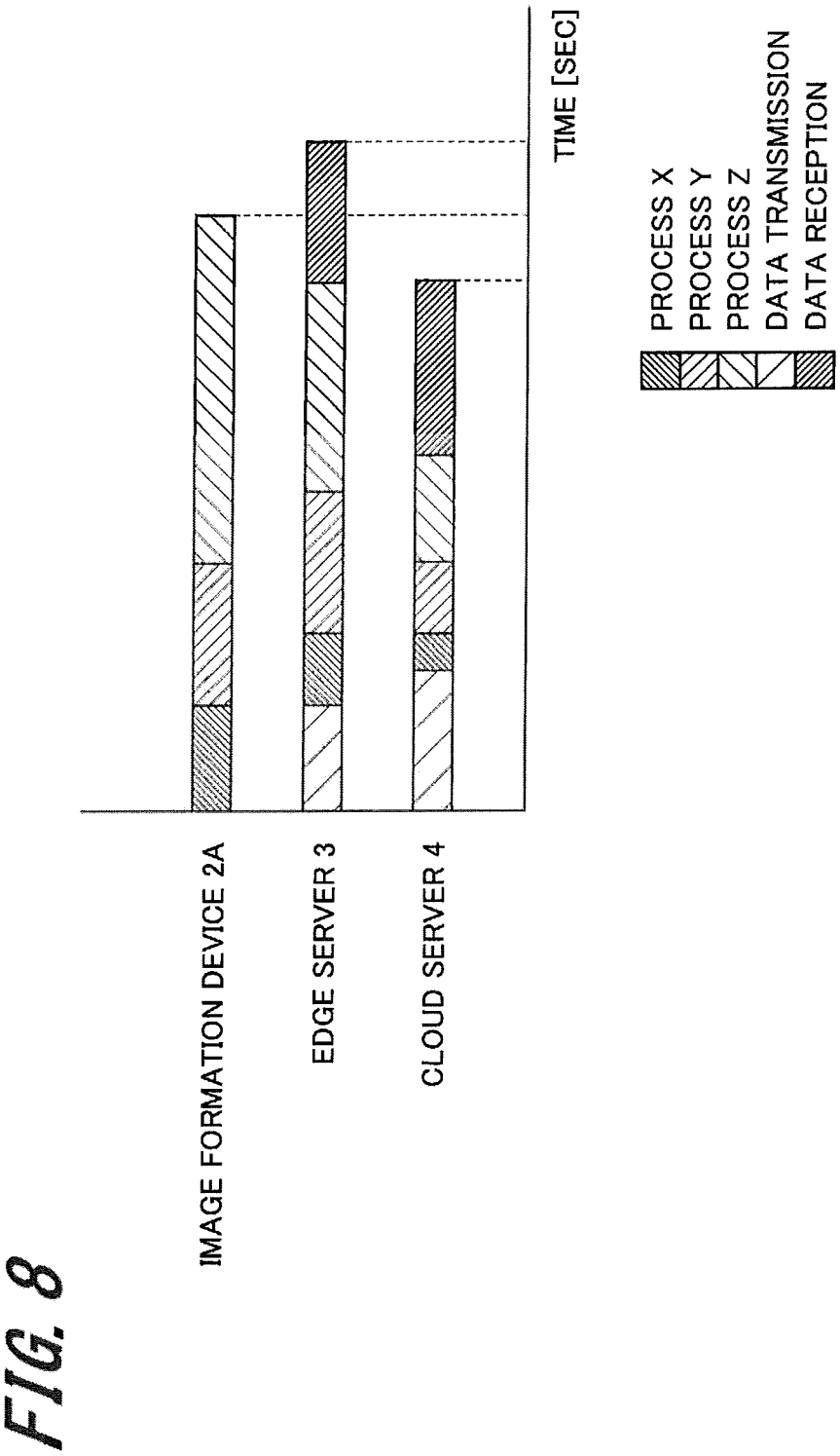
FIG. 8 is a diagram illustrating exemplary time requirements for the completion of an objectization process performed by each processing device according to an embodiment of the present invention.

FIG. 8 is a diagram illustrating exemplary time requirements for the completion of the objectization process performed by each processing device. The vertical axis indicates the processing devices, and the horizontal axis indicates the time required for the completion of the objectization process performed by each processing device. When the local processing device performs the objectization process, the time required for the completion of the objectization process is equal to the time required for the completion of the objectization process in the local processing device. Meanwhile, when a remote processing device performs the objectization process, the time required for the completion of the objectization process is equal to the sum of the time required for the local processing device to transmit the image data to the remote processing device, the time required for the remote processing device to perform the objectization process, and the time required for the completion of objectized data reception from the remote processing device.

A legend shown at lower right in FIG. 8 indicates three divisions of the objectization process, namely, processes X, Y, and Z, and the transmission and reception of various data.

For example, process X is a region separation process, process Y is a drawing conversion process, and process Z is a text conversion process. Process X, that is, the region separation process, corresponds to a process that is performed by the reader 51 (see FIG. 7) in the image formation device 2A in order to recognize an image in the image data and attach the attribute information to the image. For example, no attribute information is attached to image data that is obtained when an image of a document is captured by a camera. When such image data is inputted, the region separation process is performed to attach the attribute information to the image data. If the attribute information is already attached to inputted image data, the region separation process need not be performed. The following describes an example in which the objectization process including the region separation process is performed.

In the image formation device 2A, only processes X, Y, and Z are performed because the image data need not be transmitted or received. However, a considerable amount of time is required for the completion of processes X, Y, and Z because the CPU 11a in the image formation device 2A has a low processing capability.

As regards the edge server 3 and the cloud server 4, the time required for the image formation device 2A to transmit the image data and the time required for the image formation device 2A to receive the objectized data need to be taken into consideration in addition to the time required to perform processes X, Y, and Z. FIG. 8 indicates that the time required for the image formation device 2A to select the cloud server 4 and for the cloud server 4 to complete the objectization process is shorter than the time required for the image formation device 2A to complete the objectization process and the time required for the edge server 3 to complete the objectization process. Therefore, the device selector 53c in the image formation device 2A decides to perform the objectization process by using the cloud server 4. The data transceiver 53d1 then transmits to the cloud server 4 the image data and an instruction for starting the objectization process.

Subsequently, when the objectization process is completed by the cloud server 4, the data transceiver 53d1 receives the objectized data from the cloud server 4. If the image data objectization process is performed for each page, a plurality of objectized data exist. Therefore, the data integrator 53d2 integrates the plurality of objectized data on an individual page basis to obtain single object data. As a result, the image formation device 2A obtains objectized data that is integrated into a single file.

Figure 9:
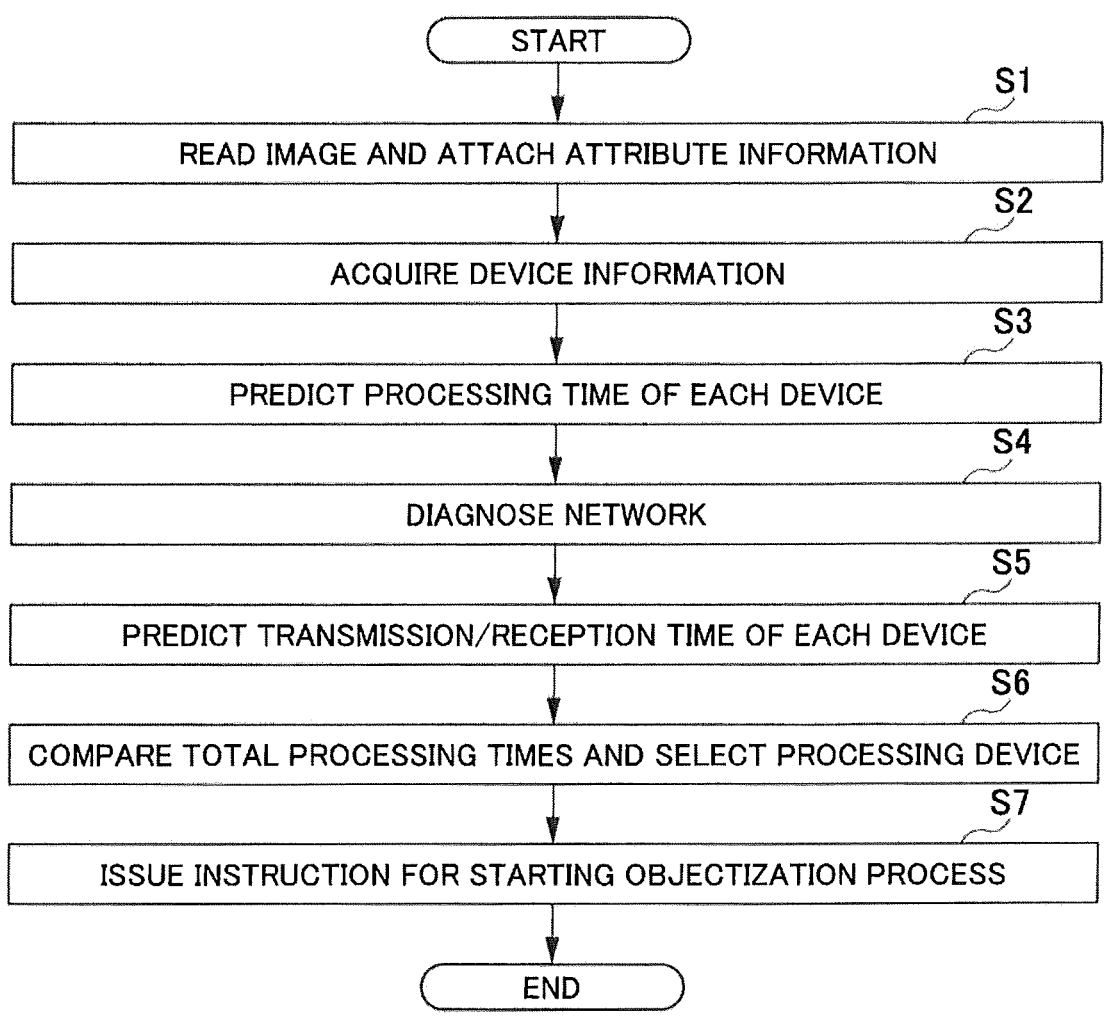
FIG. 9 is a flowchart illustrating an example of the objectization process according to an embodiment of the present invention.

FIG. 9 is a flowchart illustrating an example of the objectization process. It is assumed that this process is performed by the image formation device 2A.

When the user operates the image formation device 2A in such a manner that, for example, a document read by the scanner 21a is to be outputted in the form of objectized data, the reader 51 controls the scanner 21a to read, for example, the document and attach attribute information to each pixel of an image (S1). Then, the reader 51 passes the image data to which the attribute information is attached to the objectization processor 53.

Next, the device information acquirer 52 acquires device information about the edge server 3 connected through the internal network N1, the image formation devices 2B-2N, or the cloud server 4 connected through the external network N2 (S2).

Next, based on the device information acquired by the device information acquirer 52, the conversion time predictor 53b1 in the time predictor 53b predicts the time required for each processing device to complete the objectization process (S3). The available resources in each processing device vary, for example, with the processing capability of the CPU 11a, 31a, 41a, the size of the storage 12, 32, 42, and the presence of a currently executed process. Therefore, the conversion time predictor 53b1 calculates the length of time required for the objectization process in accordance, for example, with the file size of image data and the attribute information. The length of time required for the objectization process is calculated based, for example, on the load imposed on the objectization process, the number of steps of objectization processing, and the clock frequency of the CPU 11a, 31a, 41a.

Next, the transmission/reception time predictor 53b2 verifies the network conditions by diagnosing the internal network N1 and the external network N2 (S4). Then, based on the amount of image data for each processing device, the transmission/reception time predictor 53b2 predicts a data transmission time required for the transmission of image data and a data reception time required for the reception of objectized data (S5).

Next, the device selector 53c determines a total processing time required for acquiring the objectized data from the image data. In a case where the image formation device 2A performs the objectization process by itself, the total processing time is expressed by the time between the start and completion of the objectization process. Meanwhile, in a case where the edge server 3 or the cloud server 4 performs the objectization process, the total processing time is expressed by the time between the start of image data transmission from the image formation device 2A to the edge server 3 or the cloud server 4 and the completion of objectized data reception from the server after the server's objectization process on the image data. The device selector 53c then compares the total processing time of each processing device, and selects a processing device that requires the shortest total processing time (S6).

Next, the device selector 53c instructs the selected processing device to start the objectization process (S7). If the image formation device 2A itself is selected by the device selector 53c, the object converter 53a in the image formation device 2A performs the objectization process. If, by contrast, a remote processing device is selected by the device selector 53c, the data transceiver 53d1 transmits the image data to the selected remote processing device, and receives the objectized data from the selected remote processing device. If necessary, the data integrator 53d2 integrates the objectized data. Subsequently, the objectization process terminates.

Error Handling

A method of handling a case where a measured value of the time required for the completion of the objectization process does not agree with a predicted value will now be described with reference to FIGS. 10 and 11.

Figure 10:
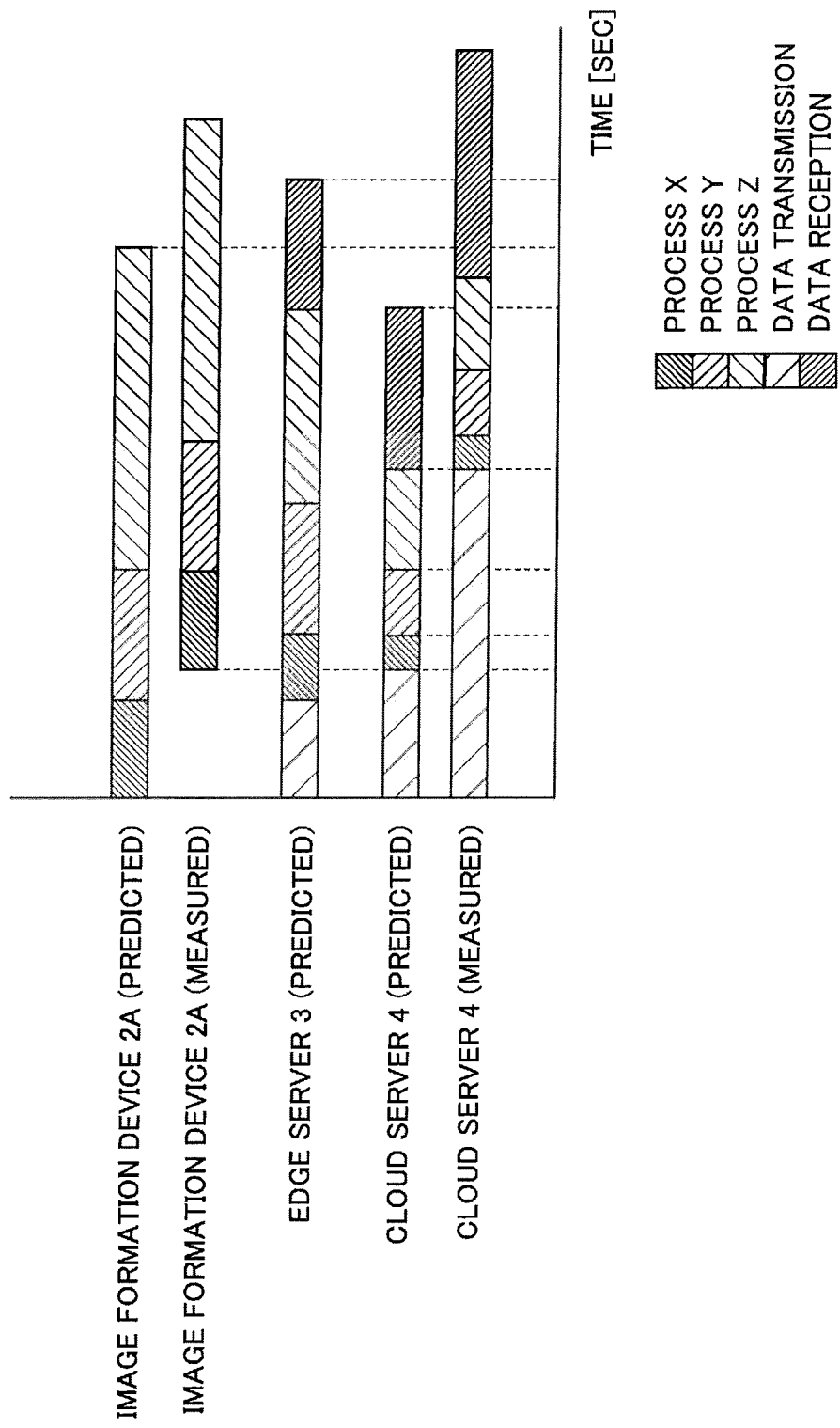
FIG. 10 is a diagram illustrating examples of predicted values and measured values of time requirements for the completion of the objectization process performed by the image formation device, edge server, and cloud server according to an embodiment of the present invention.

FIG. 10 is a diagram illustrating examples of predicted values and measured values of time requirements for the completion of the objectization process performed by the image formation device 2A, the edge server 3, and the cloud server 4. A legend shown at lower right in FIG. 10 is the same as the legend shown in FIG. 8.

After instructing the processing device selected by the device selector 53c to start the objectization process, the objectization processor 53 compares a predicted value and measured value of the time point at which the data transceiver 53d1 receives a notification about the objectization process from the processing device. The notification about the objectization process may indicate, for example, the start of image data reception, the completion of image data reception, the start of objectization process, the completion of objectization process, the start of objectized data transmission, and the completion of objectized data transmission.

FIG. 10 illustrates an example in which processing is started by the cloud server 4. Due to an increase in the load on the external network N2, the measured values of the time required for the completion of the objectization process in the image formation device 2A and the cloud server 4 are greater than the predicted values. Therefore, if nothing is done after the cloud server 4 was instructed to perform the objectization process according to an original plan, it takes a considerable amount of time for the image formation device 2A to acquire the objectized data. In such an instance, the device selector 53c selects a processing device that is supposed to complete the objectization process within a shorter period of time than the cloud server 4 and make the objectized data available. According to the original predicted values, the time required for the completion of the objectization process is the shortest in the cloud server 4 and the second shortest in the local processing device, that is, the image formation device 2A. Therefore, the device selector 53c selects the image formation device 2A and instructs the image formation device 2A to perform the objectization process.

If an error occurs so that the data transceiver 53d1 fails to receive a notification about the objectization process at a predicted time point, the device selector 53c instructs a later-selected remote processing device to perform the objectization process, and allows an earlier-selected remote processing device and the later-selected remote processing device to perform the objectization process in a parallel manner. Thus, the cloud server 4 and the image formation device 2A perform the objectization process on the same image data in a parallel manner. As a result, the image formation device 2A is able to acquire the objectized data from a processing device that has completed the objectization process at an earlier time point.

If an error occurs in a remote processing device connected to the internal network N1, the device selector 53c selects a remote processing device connected to the external network N2, and instructs the selected remote processing device to perform the objectization process. If an error occurs in a remote processing device connected to the external network N2, the device selector 53c selects a remote processing device connected to the internal network N1, and instructs the selected remote processing device to perform the objectization process. In this manner, the device selector 53c is able to transmit and receive various data by selecting the internal network N1 or the external network N2, whichever is not affected by load.

Further, the device selector 53c is able to later select a remote processing device placed in a standby state and instruct the selected remote processing device to perform the objectization process. The standby state is a state where the remote processing device is not performing a high-priority process. The remote processing device in the standby state is able to start the objectization process immediately after receiving an instruction for starting the objectization process. Upon receiving the objectized data from the earlier-selected remote processing device or the later-selected remote processing device, the device selector 53c issues an instruction for aborting the objectization process to the remote processing device from which the objectized data is not received. FIG. 11 mentioned below is a diagram illustrating a concrete example of error handling.

Figure 11:
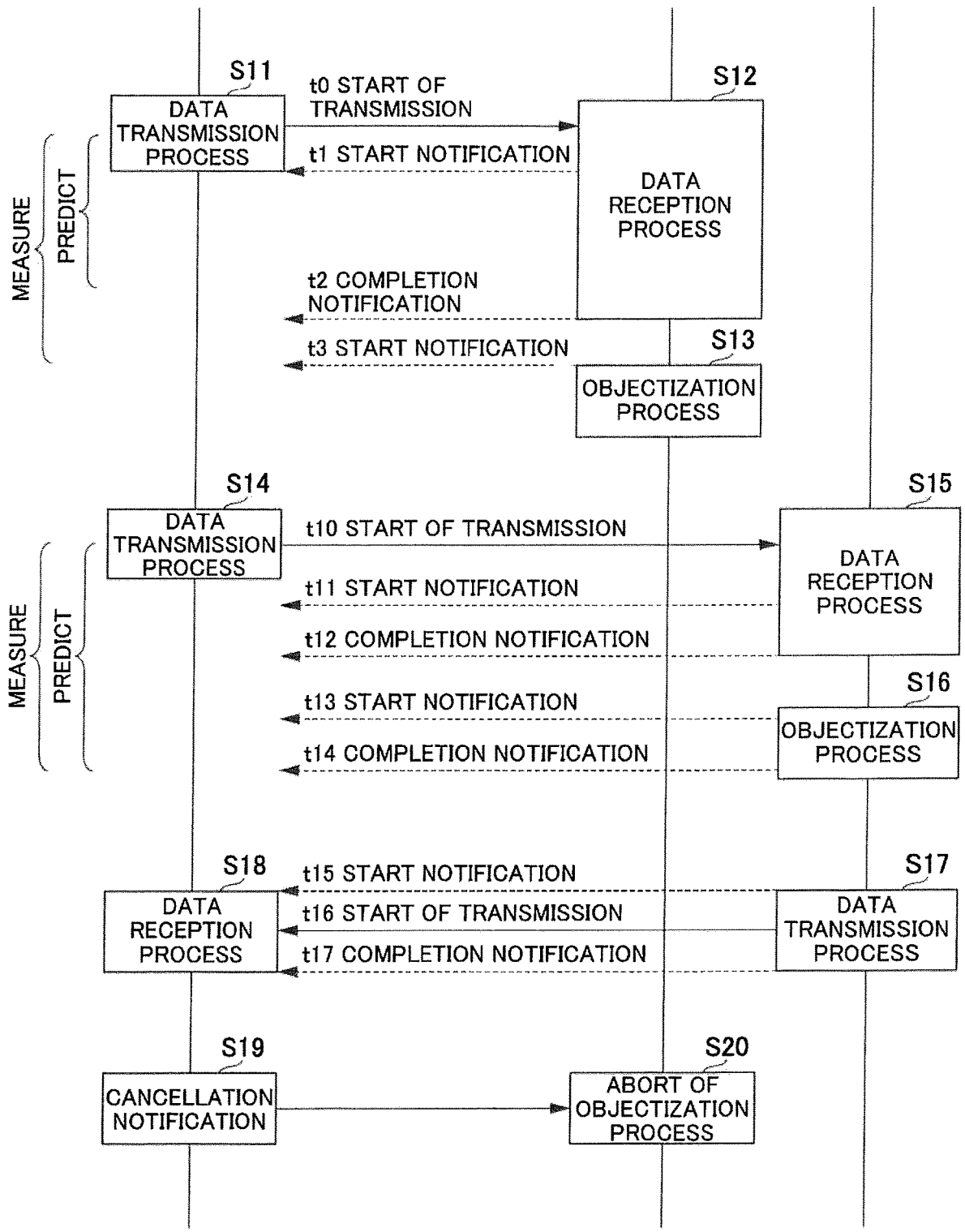
FIG. 11 is a sequence diagram illustrating an example of error handling by the data conversion system according to an embodiment of the present invention.

FIG. 11 is a sequence diagram illustrating an example of error handling by the data conversion system 1. FIG. 11 assumes that the predicted values of the time required for the completion of the objectization process, which are predicted beforehand by the time predictor 53b in the image formation device 2A, are, in order from the shortest to the longest, the time required for the cloud server 4, the time required for the edge server 3, and the time required for the image formation device 2A. This error handling assumes that the cloud server 4 is selected earlier as the processing device for performing the objectization process, and that the edge server 3 is selected later as the processing device for performing the objectization process.

First of all, the image formation device 2A issues an objectization process start instruction to the cloud server 4, notifies the cloud server 4 of the start of image data transmission, and starts a process of transmitting the image data to the cloud server 4 at time t0 (S11). Upon starting the reception of the image data, the data transceiver 71a in the cloud server 4 transmits an image data reception start notification to the image formation device 2A at time t1 (S12). Upon completion of image data reception, the data transceiver 71a transmits a reception completion notification to the image formation device 2A at time t2.

Next, the object converter 71b in the cloud server 4 starts the objectization process on the received image data (S13). Then, at time t3, the data transceiver 71a transmits an objectization process start notification to the image formation device 2A.

Here, it is assumed that the time at which the image formation device 2A receives the objectization process start notification from the cloud server 4 is predicted to be earlier than time t2. It is also assumed that a measured time value is longer than a predicted time value indicative of the time at which the image formation device 2A receives a data reception completion notification from the cloud server 4 after starting to transmit data to the cloud server 4. In such an instance, the transmission of image data is delayed due to an increase in the load imposed on the external network N2. It is therefore conceivable that the cloud server 4 takes a considerable amount of time to start the objectization process. If a measured time value is longer than a predicted time value indicative of the time of notification as described above, the device selector 53c selects the edge server 3, which is different from the earlier-selected cloud server 4, and instructs the edge server 3 to perform the objectization process. In this instance, however, an objectization process instruction issued to the cloud server 4 remains uncancelled. Therefore, the two processing devices, namely, the edge server 3 and the cloud server 4, perform the objectization process on the same image data in a parallel manner.

After step S13, the image formation device 2A issues an objectization process start instruction to the edge server 3, notifies the edge server 3 of the start of image data transmission, and starts a process of transmitting the image data to the edge server 3 at time t10 (S14). Upon starting the reception of the image data, the data transceiver 61a in the edge server 3 transmits an image data reception start notification to the image formation device 2A at time t11 (S15). Upon completion of image data reception, the data transceiver 61a transmits a reception completion notification to the image formation device 2A at time t12.

Next, the object converter 61b in the edge server 3 starts the objectization process on the received image data (S16). Then, at time t13, the data transceiver 61a transmits an objectization process start notification to the image formation device 2A. When the objectization process on the image data is completed by the object converter 61b, the data transceiver 61a transmits an objectization process completion notification to the image formation device 2A at time t14.

Here, it is assumed that measured time values indicative of the time at which the image formation device 2A starts a process of receiving image data from the edge server 3, the time at which the image formation device 2A completes the image data reception process, the time at which the image formation device 2A receives the objectization process start notification, and the time at which the image formation device 2A receives the objectization process completion notification are substantially equal to or shorter than predicted time values. In such an instance, the image formation device 2A receives the objectized data from the edge server 3.

Consequently, the edge server 3 transmits an objectized data transmission start notification to the image formation device 2A at time t15, and transmits the objectized data to the image formation device 2A at time t16 (S17). The image formation device 2A performs a process of receiving the objectized data from the edge server 3 (S18). Upon completing a transmission process on the whole objectized data, the data transceiver 61a notifies the image formation device 2A at time t17 of the completion of an objectized data transmission process.

It is assumed that the image data objectization process is still being performed by the cloud server 4 during steps S14 to S18. In such an instance, the data transceiver 53d1 in the image formation device 2A issues a cancellation notification to the cloud server 4 in order to cancel the objectization process (S19). When the data transceiver 61a in the cloud server 4 receives the cancellation notification from the image formation device 2A, the object converter 71b aborts the currently executed objectization process (S20), and terminates the error handling process.

Based on the attribute information attached to image data, the above-described data conversion system 1 according to an embodiment of the present invention predicts the time required for the completion of the objectization process in each processing device. The data conversion system 1 then determines, in accordance, for example, with network speed and CPU conditions, whether processing is to be performed by the local processing device or a remote processing device. Here, the image formation device 2A predicts the time required for the completion of the objectization process before its execution, and selects a processing device in accordance with the result of prediction so that the objectization process is to be performed by an optimal processing device suitable for the conditions of the internal network N1 and external network N2. If a decision is made so as to let a remote processing device perform processing, one of the remote processing devices is selected and used to convert the image data to objectized data. In this manner, a processing device that makes it possible to acquire the objectized data within a short period of time is selected and used to perform the objectization process of converting the image data to the objectized data. Consequently, the time required for completing the objectization process and acquiring the objectized data is shortened. As a result, the user operating the image formation device 2A acquires the objectized data in a reduced period of time.

Further, if a measured time value indicative of the time required for acquiring the objectized data from a remote processing device that is connected to one of the networks and instructed to perform the objectization process is longer than a predicted time value, the image formation device 2A instructs a remote processing device connected to the other network to perform the objectization process. If the objectization process performed by the remote processing device connected to the other network is completed at an earlier time point, the image formation device 2A acquires the objectized data from that processing device. In this manner, the image formation device 2A selects and instructs a plurality of processing devices to perform the objectization process, and allows the selected processing devices to perform the objectization process in a parallel manner. As a result, even if an increased load is imposed on the internal network N1 or the external network N2, the time required for the image formation device 2A to acquire the objectized data can be reduced.

Modified Embodiments

If, for example, a high-priority job arrives at the image formation device 2A while the objectization process is being performed by the image formation device 2A, a measured time value indicative of the time of completion of the objectization process by the image formation device 2A is later than a predicted time value. In such an instance, the image formation device 2A may transmit image data to the edge server 3 or the cloud server 4 and instruct the edge server 3 or the cloud server 4 to perform the objectization process, thereby allowing the image formation device 2A and the edge server 3 or the cloud server 4 to perform the objectization process in a parallel manner. In this manner, after executing the high-priority job, the image formation device 2A is able to acquire the objectized data from a processing device that has completed the objectization process at an earlier time point.

A predicted value indicative of a time point reported to the image formation device 2A from a remote processing device often disagrees with a measured value. Therefore, if the image formation device 2A is not performing a process other than the objectization process, the image formation device 2A may instruct a remote processing device to perform the objectization process and allow itself to perform the objectization process in a parallel manner. This case also permits the image formation device 2A to immediately acquire the objectized data when a certain processing device completes the objectization process.

After the image formation device 2A instructs a remote processing device to perform the objectization process and acquires the objectized data from the remote processing device, the image formation device 2A may issue an instruction for deleting the image data and objectized data stored in the remote processing device.

The conversion time predictor 53b1 may predict the conversion time required for the local processing device and a remote processing device to perform each division of the objectization process, and the device selector 53c may select the local processing device or the remote processing device for each division of the objectization process in accordance with the predicted conversion time, and preferentially instruct the selected processing device to perform a particular division of the objectization process. As illustrated in FIG. 8, the divisions of the objectization process include process X, process Y, and process Z, which are independent of each other. Process X separates a region from image data and attaches attribute information to the image data. Process Y converts an image having a drawing as its attribute information into a drawing object. Process Z converts an image having text as its attribute information into a text object. If a plurality of image data are included in one page, a processing device for performing the objectization process on each image data is selected to allow each processing device to perform the objectization process. Objectized data divided by the divisions of the objectization process are then integrated into a single file by the data integrator 53d2.

The device selector 53c in the image formation device 2A may select one of the image formation devices 2B-2N or the edge server 3, which are connected to the internal network N1, and preferentially instruct the selected processing device to perform the objectization process. This eliminates the necessity of transmitting image data to the cloud server 4 when the image data should not be exposed to the outside, and conceals the image data and the objectized data. Similarly, the device selector 53c in the image formation device 2A may select one of the image formation devices 2B-2N or the edge server 3, which are connected to the internal network N1, and preferentially instruct the selected processing device to perform the objectization process on image data including security information. If, for example, a security setting selected for image data is determined to be "high", only a processing device connected to the internal network N1 may be instructed to perform the objectization process by excluding the cloud server 4, which is connected to the external network N2, from candidates for being instructed to perform the objectization process.

A processing device highly likely to perform an additional process in the middle of the objectization process and a frequently used processing device may be excluded beforehand from processing device candidates for being instructed to perform the objectization process. Further, a processing device having performed the objectization process several times may be highly prioritized as a processing device candidate.

The data conversion system 1 is not limited to the configuration illustrated in FIG. 1. The data conversion system 1 may alternatively be configured so that one or more processing devices capable of performing the objectization process are connected to the image formation device 2A through a network.

The foregoing embodiments have been described on the assumption that all network-connected processing devices are selected as candidates for being instructed to perform the objectization process in order to simply compare the values of total processing time. However, processing device selections and exclusions may be determined based on a device at an image data output destination (selectable, for example, from a USB memory, a server, and a processing device to which electronic mail is addressed). If a processing device at the image data output destination is capable of performing the objectization process, the image formation device 2A may instruct such a processing device to perform the objectization process.

If a user-inputted instruction for performing the objectization process is issued to the local processing device, the device selector 53c preferentially instructs the object converter 53a in the local processing device to perform the objectization process. Further, if the instruction for performing the objectization process is issued to the remote processing devices, the device selector 53c preferentially instructs a processing device selected from the remote processing devices to perform the objectization process. This ensures that the objectization process is performed by a user-selected processing device.

The operating display 22 on the image formation device 2A may display the time required for each processing device to complete the objectization process, thereby allowing the user to select a processing device that performs the objectization process.

For the image formation devices 2A-2N, a PC on which, for example, a printer driver for entering printer settings and application software for preparing documents or drawings are installed may be connected to the internal network N1. It is assumed that the PC has the same configuration as the edge server 3 or the cloud server 4 and includes a display and an operating control. If the PC has a higher processing capability than the image formation devices 2A-2N, the PC may be allowed to perform the objectization process.

According to the present invention, a processing device that acquires objectized data within a short period of time is selected, and the selected processing device performs an objectization process. This reduces the time required to complete the objectization process and obtain the objectized data.

Although embodiments of the present invention has been described and illustrated in detail, the present invention is not limited to the foregoing embodiments. Persons of skill in the art will appreciate that various applications and modifications can be made without departing from the scope and spirit of the present invention, which are defined by the appended claims.

For example, the foregoing embodiments have been concretely described in detail in order to facilitate the understanding of the present invention and the configurations of the devices and system. The present invention is not necessarily limited to embodiments including all the described elements. Some of the above-described elements of a foregoing embodiment may be replaced by the elements of another embodiment. Further, the elements of a foregoing embodiment may be added to the elements of another embodiment. Furthermore, some elements of each embodiment may be deleted, subjected to the addition of other elements, or replaced by other elements.

Moreover, control lines and information lines are illustrated only when they are necessary for description, and all of the control lines and information lines for a product are not always illustrated. In practice, almost all the elements may be considered to be interconnected.

REFERENCE SIGNS LIST 1 data conversion system
2A-2N image formation devices
3 edge server
4 cloud server
11 controller
21a scanner
51 reader
52 device information acquirer
53 object processor
53a object converter
53b time predictor
53b1 conversion time predictor
53b2 transmission/reception time predictor
53c device selector
53d data manager
53d1 data transceiver
53d2 data integrator

What is claimed is:
1. A local processing device comprising:
a device information acquirer that acquires device information about the local processing device and device information about remote processing devices connected to the local processing device through a network; and an objectization processor that generates objectized data from image data;

wherein the objectization processor includes an object converter that generates, based on attribute information attached to an image in the image data, the objectized data by performing an objectization process of converting the image to an object, a time predictor that predicts, based on the device information and the attribute information attached to the image data, the time required for each of the local processing device and the remote processing devices to perform the objectization process of converting the image data to the objectized data, a device selector that selects, based on the predicted time, the local processing device or one of the remote processing devices as a processing device that requires a shortest processing time to perform the objectization process, and instructs the selected processing device to perform the objectization process, and a data manager that manages the image data that is to be transmitted from a data transceiver to the selected processing device, and the objectized data that is to be received by the data transceiver from the selected processing device, wherein the data transceiver receives a notification about the objectization process from the selected processing device; and wherein, if an error occurs so that the data transceiver fails to receive the notification about the objectization process at a predicted time point, the device selector instructs a later-selected remote processing device to perform the objectization process, and allows an earlier-selected remote processing device and the later-selected remote processing device to perform the objectization process in a parallel manner.

2. The processing device according to claim 1,
wherein the network includes an internal network and an external network, the internal network being connected to the local processing device, the external network being different from the internal network; and
wherein the remote processing devices are connected to the internal network, to the boundary between the internal network and the external network, or to the external network.

3. The processing device according to claim 2,
wherein the remote processing devices connected to the internal network are image formation devices that are similar in functionality to the local processing device; and
wherein the remote processing devices connected to the boundary between the internal network and the external network or to the external network are servers.

4. The processing device according to claim 2,
wherein the time predictor includes
a conversion time predictor that predicts, based on the device information, the conversion time required for each of the object converter in the local processing device and the object converter in the remote processing devices to convert the image to the objectized data in accordance with the attribute information attached to the image data, and
a transmission/reception time predictor that predicts a data transmission time and a data reception time, the data transmission time being a period of time required for the local processing device to transmit the image data to the remote processing devices through the network, the data reception time being a period of time required for the local processing device to receive the objectized data from the remote processing devices.

5. The processing device according to claim 4,
wherein, if the difference between the sum of the conversion time, data transmission time, and data reception time predicted for the remote processing devices and the conversion time predicted for the local processing device is equal to or smaller than a predetermined value, the device selector selects the local processing device and preferentially instructs the local processing device to perform the objectization process.

6. The processing device according to claim 4,
wherein the device selector selects a processing device for which the shortest sum of the conversion time, data transmission time, and data reception time is predicted, and preferentially instructs the selected processing device to perform the objectization process.

7. The processing device according to claim 4,
wherein the device selector preferentially instructs a processing device selected from the remote processing devices connected to the internal network to perform the objectization process.

8. The processing device according to claim 4,
wherein, if a user-inputted instruction for performing the objectization process is issued to the local processing device, the device selector selects the local processing device and preferentially instructs the local processing device to perform the objectization process; and
wherein, if the instruction for performing the objectization process is issued to the remote processing devices, the device selector preferentially instructs a processing device selected from the remote processing devices to perform the objectization process.

9. The processing device according to claim 4,
wherein the data manager includes an integrator that integrates, in order of pages, the objectized data on each page for which the objectization process is performed by a plurality of remote processing devices selected by the device selector in such a manner that the image data on a plurality of pages are objectized in units of a predetermined number of pages.

10. The processing device according to claim 9,
wherein the conversion time predictor predicts the conversion time required for each of the local processing device and remote processing devices to perform each division of the objectization process; and
wherein the device selector selects, based on the predicted conversion time, the local processing device or one of the remote processing devices for each division of the objectization process, and preferentially instructs the selected processing device to perform the objectization process.

11. The processing device according to claim 10,
wherein the divisions of the objectization process include a process of identifying regions from the image data and attaching the attribute information to the image data, a process of converting an image having a drawing as the attribute information into a drawing object, and a process of converting an image having text as the attribute information into a text object; and
wherein, if the attribute information is not attached to the image data, the object converter attaches the attribute information to the image included in the image data.

12. The processing device according to claim 2,
wherein, if the error occurs in a remote processing device connected to the internal network, the device selector instructs a remote processing device connected to the external network to perform the objectization process; and
wherein, if the error occurs in the remote processing device connected to the external network, the device selector instructs the remote processing device connected to the internal network to perform the objectization process.

13. The processing device according to claim 12,
wherein the device selector later selects a remote processing device placed in a standby state and instructs the selected remote processing device to perform the objectization process.

14. The processing device according to claim 1,
wherein, if the objectized data is received from the earlier-selected remote processing device or the later-selected remote processing device, the device selector issues an instruction for aborting the objectization process to the remote processing device from which the objectized data is not received.

15. The processing device according to claim 1, further comprising:
a reader that attaches the attribute information to the image data generated by reading a sheet of paper on which an image is formed.

16. The processing device according to claim 1,
wherein the attribute information is a code indicating that the image is a drawing, text, or information other than a drawing and text; and
wherein the object converter performs an objectization process of converting, to the object, only the image to which the code indicative of the drawing or the text is attached.

17. The processing device according to claim 1, wherein objectization is a process of converting data of an image including text and/or recognizable objects into codes representing such text and/or objects.

18. A non-transitory recording medium storing a computer-readable program, the program causing a computer to perform:
acquiring device information about a local processing device and device information about remote processing devices connected to the local processing device through a network;
generating objectized data based on attribute information attached to an image in image data by performing an objectization process of converting the image to an object;
predicting the time required for each of the local processing device and the remote processing devices to convert the image data to the objectized data by performing the objectization process based on the device information and the attribute information attached to the image data;
selecting, based on the predicted time, from the local processing device and the remote processing devices, the processing device that acquires the objectized data derived from the image data within a shortest period of time, and instructing the selected processing device to perform the objectization process;
managing the image data to be transmitted to the selected processing device and the objectized data to receive from the selected processing device;
receiving a notification about the objectization process from the selected processing device; and
if an error occurs so that the notification about the objectization process is unreceivable at a predicted time point, instructing a later-selected remote processing device to perform the objectization process, and allowing an earlier-selected remote processing device and the later-selected remote processing device to perform the objectization process in a parallel manner.

19. The non-transitory recording medium storing a computer-readable program according to claim 18,
wherein the network includes an internal network and an external network, the internal network being connected to the local processing device, the external network being different from the internal network; and
wherein the remote processing devices are connected to the internal network, to the boundary between the internal network and the external network, or to the external network.

20. The non-transitory recording medium storing a computer-readable program according to claim 19,
wherein the remote processing devices connected to the internal network are image formation devices that are similar in functionality to the local processing device; and
wherein the remote processing devices connected to the boundary between the internal network and the external network or to the external network are servers.

21. The non-transitory recording medium storing a computer-readable program according to claim 19, the program further causing a computer to perform:
predicting, based on the device information, the conversion time required for each of the local processing device and remote processing devices to convert the image to the objectized data in accordance with the attribute information attached to the image data, and
predicting a data transmission time and a data reception time, the data transmission time being a period of time required for the local processing device to transmit the image data to the remote processing devices through the network, the data reception time being a period of time required for the local processing device to receive the objectized data from the remote processing devices.

22. The non-transitory recording medium storing a computer-readable program according to claim 21, the program further causing a computer to perform:
if the difference between the sum of the conversion time, data transmission time, and data reception time predicted for the remote processing devices and the conversion time predicted for the local processing device is equal to or smaller than a predetermined value, selecting the local processing device and preferentially instructing the local processing device to perform the objectization process.

23. The non-transitory recording medium storing a computer-readable program according to claim 21, the program further causing a computer to perform:
selecting a processing device for which the shortest sum of the conversion time, data transmission time, and data reception time is predicted, and preferentially instructing the selected processing device to perform the objectization process.

24. The non-transitory recording medium storing a computer-readable program according to claim 21, the program further causing a computer to perform:

preferentially instructing a processing device selected from the remote processing devices connected to the internal network to perform the objectization process.

25. The non-transitory recording medium storing a computer-readable program according to claim 21, the program further causing a computer to perform:
if a user-inputted instruction for performing the objectization process is issued to the local processing device, selecting the local processing device and preferentially instructing the local processing device to perform the objectization process, and if the instruction for performing the objectization process is issued to the remote processing devices, preferentially instructing a processing device selected from the remote processing devices to perform the objectization process.

26. The non-transitory recording medium storing a computer-readable program according to claim 21, the program further causing a computer to perform:
integrating, in order of pages, the objectized data on each page for which the objectization process is performed by a plurality of remote processing devices selected in such a manner that the image data on a plurality of pages are objectized in units of a predetermined number of pages.

27. The non-transitory recording medium storing a computer-readable program according to claim 26, the program further causing a computer to perform:
predicting the conversion time required for each of the local processing device and remote processing devices to perform each division of the objectization process; and
based on the predicted conversion time, selecting the local processing device or one of the remote processing devices for each division of the objectization process, and preferentially instructs the selected processing device to perform the objectization process.

28. The non-transitory recording medium storing a computer-readable program according to claim 27, wherein the divisions of the objectization process include a process of identifying regions from the image data and attaching the attribute information to the image data, a process of converting an image having a drawing as the attribute information into a drawing object, and a process of converting an image having text as the attribute information into a text object, the program further causing a computer to perform:
if the attribute information is not attached to the image data, attaching the attribute information to the image included in the image data.

29. The non-transitory recording medium storing a computer-readable program according to claim 19, the program further causing a computer to perform:
if the error occurs in a remote processing device connected to the internal network, instructing a remote processing device connected to the external network to perform the objectization process, and if the error occurs in the remote processing device connected to the external network, instructing the remote processing device connected to the internal network to perform the objectization process.

30. The non-transitory recording medium storing a computer-readable program according to claim 29, the program further causing a computer to perform:
later selecting a remote processing device placed in a standby state and instructing the selected remote processing device to perform the objectization process.

31. The non-transitory recording medium storing a computer-readable program according to claim 18, the program further causing a computer to perform:
if the objectized data is received from the earlier-selected remote processing device or the later-selected remote processing device, issuing an instruction for aborting the objectization process to the remote processing device from which the objectized data is not received.

32. The non-transitory recording medium storing a computer-readable program according to claim 18, the program further causing a computer to perform:
attaching the attribute information to the image data generated by reading a sheet of paper on which an image is formed.

33. The non-transitory recording medium storing a computer-readable program according to claim 18,
wherein the attribute information is a code indicating that the image is a drawing, text, or information other than a drawing and text, the program further causing a computer to perform:
an objectization process of converting, to the object, only the image to which the code indicative of the drawing or the text is attached.

34. The non-transitory recording medium storing a computer-readable program according to claim 18, wherein objectization is a process of converting data of an image including text and/or recognizable objects into codes representing such text and/or objects.

35. A data conversion system comprising:
a first processing device; and
second processing devices connected to the first processing device through a network;
wherein the first processing device includes
a device information acquirer that acquires device information about the first processing device and device information about the second processing devices, and
an objectization processor that generates objectized data from image data;
wherein the objectization processor includes a first object converter that generates, based on attribute information attached to an image in the image data, the objectized data by performing an objectization process of converting the image to an object,
a time predictor that predicts, based on the device information and the attribute information attached to the image data, the time required for each of the first processing device and second processing devices to perform the objectization process of converting the image data to the objectized data,
a device selector that selects, based on the predicted time, the first processing device or one of the second processing devices as a processing device that requires a shortest processing time to perform the objectization process, and instructs the selected processing device to perform the objectization process, and
a data manager that manages the image data that is to be transmitted from a first data transceiver to the selected processing device, and the objectized data that is to be received by the first data transceiver from the selected processing device; and
wherein the second processing devices each include
a second object converter that generates, based on attribute information attached to an image in the image data received from the first processing device, the objectized data by performing an objectization process of converting the image to an object, and a second data transceiver that receives the image data from the first processing device and transmits the objectized data generated by the second object converter to the first processing device, wherein the first data transceiver receives a notification about the objectization process from the selected processing device, and wherein, if an error occurs so that the first data transceiver fails to receive the notification about the objectization process at a predicted time point, the device selector instructs a later-selected second processing device to perform the objectization process, and allows an earlier-selected second processing device and the later-selected second processing device to perform the objectization process in a parallel manner.

36. The data conversion system according to claim 35, wherein the network includes an internal network and an external network, the internal network being connected to the first processing device, the external network being different from the internal network; and wherein the second processing devices are connected to the internal network, to the boundary between the internal network and the external network, or to the external network.

37. The data conversion system according to claim 36, wherein the second processing devices connected to the internal network are image formation devices that are similar in functionality to the first processing device; and wherein the second processing devices connected to the boundary between the internal network and the external network or to the external network are servers.

38. The data conversion system according to claim 36, wherein the time predictor includes a conversion time predictor that predicts, based on the device information, the conversion time required for each of the first object converter in the first processing device and the first object converter in the second processing devices to convert the image to the objectized data in accordance with the attribute information attached to the image data, and a transmission/reception time predictor that predicts a data transmission time and a data reception time, the data transmission time being a period of time required for the first processing device to transmit the image data to the second processing devices through the network, the data reception time being a period of time required for the first processing device to receive the objectized data from the second processing devices.

39. The data conversion system according to claim 38, wherein, if the difference between the sum of the conversion time, data transmission time, and data reception time predicted for the second processing devices and the conversion time predicted for the first processing device is equal to or smaller than a predetermined value, the device selector selects the first processing device and preferentially instructs the first processing device to perform the objectization process.

40. The data conversion system according to claim 38, wherein the device selector selects a processing device for which the shortest sum of the conversion time, data transmission time, and data reception time is predicted, and preferentially instructs the selected processing device to perform the objectization process.

41. The data conversion system according to claim 38, wherein the device selector preferentially instructs a processing device selected from the second processing devices connected to the internal network to perform the objectization process.

42. The data conversion system according to claim 38, wherein, if a user-inputted instruction for performing the objectization process is issued to the first processing device, the device selector selects the first processing device and preferentially instructs the first processing device to perform the objectization process; and wherein, if the instruction for performing the objectization process is issued to the second processing devices, the device selector preferentially instructs a processing device selected from the second processing devices to perform the objectization process.

43. The data conversion system according to claim 38, wherein the data manager includes an integrator that integrates, in order of pages, the objectized data on each page for which the objectization process is performed by a plurality of second processing devices selected by the device selector in such a manner that the image data on a plurality of pages are objectized in units of a predetermined number of pages.

44. The data conversion system according to claim 43, wherein the conversion time predictor predicts the conversion time required for each of the first processing device and second processing devices to perform each division of the objectization process; and wherein the device selector selects, based on the predicted conversion time, selects the first processing device or one of the second processing devices for each division of the objectization process, and preferentially instructs the selected processing device to perform the objectization process.

45. The data conversion system according to claim 44, wherein the divisions of the objectization process include a process of identifying regions from the image data and attaching the attribute information to the image data, a process of converting an image having a drawing as the attribute information into a drawing object, and a process of converting an image having text as the attribute information into a text object; and wherein, if the attribute information is not attached to the image data, the first object converter attaches the attribute information to the image included in the image data.

46. The data conversion system according to claim 36, wherein, if the error occurs in a second processing device connected to the internal network, the device selector instructs a second processing device connected to the external network to perform the objectization process; and wherein, if the error occurs in the second processing device connected to the external network, the device selector instructs the second processing device connected to the internal network to perform the objectization process.

47. The data conversion system according to claim 46, wherein the device selector later selects a second processing device placed in a standby state and instructs the selected second processing device to perform the objectization process.

48. The data conversion system according to claim 35, wherein, if the objectized data is received from the earlier-selected second processing device or the later-selected second processing device, the device selector issues an instruction for aborting the objectization process to the second processing device from which the objectized data is not received.

49. The data conversion system according to claim 35, further comprising:
a reader that attaches the attribute information to the image data generated by reading a sheet of paper on which an image is formed.

50. The data conversion system according to claim 35,
wherein the attribute information is a code indicating that the image is a drawing, text, or information other than a drawing and text; and
wherein the first object converter performs an objectization process of converting, to the object, only the image to which the code indicative of the drawing or the text is attached.

51. The data conversion system according to claim 35, wherein objectization is a process of converting data of an image including text and/or recognizable objects into codes representing such text and/or objects.

* * * * *